United States Patent [19]
Mosing et al.

[11] Patent Number: 6,120,067
[45] Date of Patent: *Sep. 19, 2000

[54] THREADED TOOL JOINT FOR CONNECTING LARGE TUBES

[75] Inventors: Donald J. Mosing; David L. Sipos, both of Lafayette, La.

[73] Assignee: Frank's Casing Crew and Rental Tools, Inc., Lafayette, La.

[ * ] Notice: This patent is subject to a terminal disclaimer.

[21] Appl. No.: 09/098,394

[22] Filed: Jun. 16, 1998

Related U.S. Application Data

[63] Continuation-in-part of application No. 08/643,970, May 7, 1996, Pat. No. 5,810,401.

[51] Int. Cl.[7] .................................................... F16L 25/00
[52] U.S. Cl. ......................... 285/333; 285/331; 285/390; 285/334
[58] Field of Search ................................. 285/333, 334, 285/390, 331, 355

[56] References Cited

U.S. PATENT DOCUMENTS

| | | | |
|---|---|---|---|
| 1,407,335 | 1/1922 | Reynolds et al. | 285/334 |
| 1,614,815 | 1/1927 | Wilson | 285/334 |
| 1,637,628 | 8/1927 | Weisgerber | 285/334 |
| 3,989,284 | 11/1976 | Blose | 285/334 |
| 4,161,332 | 7/1979 | Blose | 285/334 |
| 4,696,498 | 9/1987 | Church | 285/334 |
| 4,822,081 | 4/1989 | Blose | 285/334 |
| 5,507,538 | 4/1996 | Phillips | 285/334 |
| 5,810,401 | 9/1998 | Mosing | 285/333 |

*Primary Examiner*—Eric K. Nicholson
*Attorney, Agent, or Firm*—Matthews & Associates

[57] ABSTRACT

A connector for connecting large tubes of the type used in oil well tubing, casing and the like, without resorting to welding, to form a pipe string for use in drilling. The connector comprises a pin and box threaded connection having guiding surfaces integral with the pin and box members to facilitate the threaded connection of large tubes. The connection is designed so that large tubes, for example tubes comprising an external diameter of two or more feet, may be joined by threaded connection facilitated by the integral guiding surfaces of the pin and box threaded members. The integral guiding surfaces allow large tubes, which are otherwise too cumbersome to position and manipulate for threaded connection to be practical, to be quickly and safely connected by threaded engagement of the pin and box members without the use of a weld between the tubes.

19 Claims, 4 Drawing Sheets

THREADED TOOL JOINT FOR CONNECTING LARGE TUBES

This application is a continuation-in-part of U.S. patent application No. 08/643,970, filed May 7, 1996, and issued as U.S. Pat. No. 5,810,401, on Sep. 22, 1998.

FIELD OF THE INVENTION

The present invention relates to pipe connectors, particularly, but not exclusively, for use in connecting sections of a pipe string for use in drilling. More specifically, it relates to the design of a pin and box connection of the type used in oil well tubing, casing, and the like. The invention provides a driveable threaded joint with dual mating shoulders and nose faces on the pin members and box members. The dual mating shoulders substantially improve the joint's ability to withstand the intense axial compression loading that occurs when driving the pipe into the ground. A significant advance in the art is achieved by providing a threaded joint for large tubes of the types described which permits the large tubes to be connected one to another by threaded means without the use of a weld bead between the tubes, and yet still provide a reliable connection capable of withstanding the axial compression loads of drilling or other industrial scale uses.

DESCRIPTION OF RELATED ART

Connecting large diameter tubes, such as metal well bore tubes which are lowered down hole in oil wells, has been problematic in the art. Large tubes, for example tubes comprising an external diameter of two feet or greater, are cumbersome and generally have to be handled using powerful machines to grip and position the tubes. Connecting such tubes by means of threaded connection has been impractical because of the precision required in positioning and turning the cumbersome large tubes. As a consequence of the difficulty and impracticality of threadedly connecting large tubes, such tubes are generally connected by way of welding. Even where an initial connection is made by threaded engagement, it is a common practice in the art to reinforce or secure the connection with weld beads.

To connect large tubes by welding, the tube members may be stationary, so no manipulation, turning, or precision placement of the tubes is required. However, welding is very time consuming, expensive, and requires highly skilled personnel to perform.

A connector for rapidly and securely connecting large tubes by threaded engagement without the use of welding would be useful to avoid the time, expense and expertise required for a welded connection. Such a threaded connection should be designed so that the axial compression loads acting on the connection joint are not born solely by the threads of the connection, but rather, the loads should be born as much as possible by the shoulders and nose faces of the connector so that the integrity of the threads is maintained. Further, a threaded connection should be able to be made up quickly, for example is as few as approximately one and one-half turns, so that handling of the tubes is minimized to enhance the safety of making-up the connection.

Threaded connections between pipe members are typically made by providing one end of one pipe member with a male connector in the form of an externally threaded pin member, providing one end of a second pipe member with a female connector in the from of an internally threaded box member which receives the pin member. The pin and box members may be integral parts of their respective pipe members, or may be added thereto by welding or threaded engagement.

In the past, several different types of threaded connections have been designed to manage the extreme compressive, tensile, and bending forces to which the connection is exposed. Several prior art design incorporate internal and/or external matting shoulders and end faces on the pin and box members. As used in this description, the terms "end face" and "nose face" are interchangeable. In several designs, the mating shoulders are used as torque shoulders to stop axial advancement of the pin and box members during make up of the joint. In many designs, the shoulders are also used to provide resistance to axial compression during pile driving. Although many prior art designs use a combination of external and internal shoulders, these designs are usually configured such that only one of the shoulders will mate with its corresponding nose face upon initial makeup of the joint. These designs rely on either the external or the internal shoulder alone to mate with its corresponding nose face at initial make-up of the joint, with the other shoulder remaining axially spaced from its corresponding nose face at initial make-up of the joint, and some designs may never mate, or only make contact with its corresponding nose face after the threads or other portions of the joint begin to yield. It is one object of the present invention to provide a threaded connection design that uses dual mating shoulders in which both external and internal shoulders mate with their corresponding nose faces during initial make-up of the joint. By providing dual mating shoulders, the shoulders share axial compression loads and provide the joint with improved performance in resisting the extreme axial compression loads encountered during pile driving.

In addition to providing resistance to axial compression loading, the dual mating shoulders in the present invention also function as torque shoulders to stop axial advancement of the pin and box members during make-up of the joint. In several prior art designs, the threaded connections use converging or wedge-type thread flanks rather than shoulders to act as a torque stop. As used in this description, the terms "converging" and "wedge-type" are interchangeable. In general, the pin and box threads in a converging thread flanks connection have progressively changing axial widths. The axial thread width of the pin member progressively decreases in the direction of the mouth of the pin member over the length of the thread structure. The axial thread width of the box member, on the other hand, progressively decreases in the opposite direction, such that a pair of pin and box members in the fully made up condition have a mutual wedging interfit. When converging threads are screwed together and wedging between the flanks takes place, the torsional resistance of the connection increases as the thread flanks act as torque stop to axial advancement of the pin and box members. Several other thread connection designs use tapered buttress-type thread forms that rely on radial interference to stop axial advancement of the pin and box members during make-up. In a tapered threads configuration, the radial interference fit forms as the crests and roots of the pin and box threads converge upon make-up of the joint.

Although these thread form designs may succeed in providing a torque stop to halt axial advancement of the pin and box members during make-up, and also allow the threads to provide resistance to axial compression loading, taking pressure off any pin and box shoulders that may be used in the design, such use of an interference fit in the thread form has its drawbacks. Such uses of interference fits in the form may create high surface contact stresses on the threads, which can cause galling and other localized thread damage that can severely limit the number of times the connection can be made up. In addition to limiting the repetitive use of the threads, the areas of high surface contact stress are susceptible to stress corrosion cracking, known as sulfide stress cracking, that occurs in petroleum well conduits. It is one object of this invention to provide a threaded joint connection that uses the shoulders of the pin and box members rather than the threads to function as a torque stop.

Conventionally, the pin member of the joint is tapered inwardly from the proximal end of the threaded portion to the distal end to mate with a similarly tapered female threaded box member. The taper facilitates entry of the pin member in to the box member. Although the taper facilitates entry of the pin member, the wall thickness at the nose face end of a tapered thread form is often very small, especially in the flush joint configuration. Although the wall thickness at the shoulder of the pin and box member may be a substantial portion of the pipe wall thickness, with the shoulder occupying only a small portion of the wall, the wall thickness at the nose face end may be very small. This tapered configuration leaves the nose face end with a reduced wall thickness that must withstand the extreme axial compression during pile driving, as well as the extreme tensile, compressive, and bending forces to which the pipe is exposed downhole. It is an object of the present invention to provide a threaded pin and box joint in which the thread form is straight rather than tapered, to allow substantially the one-half thickness of the wall of the pin and box members for sustaining compressive, tensile, and bending forces to which the pipe is exposed.

Although a tapered thread form may facilitate entry of the pin and box members during make-up of the joint, tapered threads are still susceptible to cross-threading if the pin and box members are not properly aligned at the point of threaded engagement. One example of an apparatus designed to prevent cross-threading is found in U.S. Pat. No. 4,407,527, issued to Mr. Larry E. Reimert. The Reimert patent discloses a guide surface axially spaced from the internal threads of the box member to constrain the relative orientation between the pin and box members prior to threaded engagement. Although the Reimert design may be successful in preventing cross-threading, we have found that the guiding means may also integrate into a mating shoulder configuration by axially spacing the nose face from the thread on the pin and box members. It is therefore an object of this invention to provide a guiding means for preventing cross-threading that is integrated into the shoulders and nose faces of a pin and box connection.

Several further objects of the present invention include providing means for preventing separation of the pin and box members, providing a thread form configuration that allows quick make-up of the joint, as well as several other objects and advantages that will become apparent from a reading of the attached claims and description of the preferred embodiments.

SUMMARY

These and other objects of the invention are attained by providing one end of one pipe member with a male connector in the form of an externally threaded pin member, and providing one end of a second pipe member with a female connector in the form of an internally threaded box member which receives the pin member. The pin and box members may be integral parts of their respective pipe members, or may be added thereto by welding or threaded engagement. In the preferred embodiment of the present invention the pin and box members are integral parts of their respective pipe members, but it should be understood that the inventive design may also be used by mounting the pin and box members on their respective pipe members, or could be used in any of the various forms of collars or nipples known in the art featuring combinations of the two box ends, two pin ends, or a box end with a pin end for threaded connection to appropriate ends of two pipe members sought to be mutually connected.

A threaded connector for connecting large diameter tubes is disclosed, the connector comprising:

a first large diameter tube comprising a pin member with external threads, and a guiding surface integral with the external threads; and a second large diameter tube comprising a box member with internal threads and a guiding surface integral with the internal threads and complementary to the guiding surface of the pin member to facilitate entry of the pin member threads into the box member threads, wherein upon threaded engagement of the pin member of the first tube and the box member of the second tube, the first and second tubes may be connected in as few as approximately one and one half turns, whereby large diameter tubes may be connected one to another without a weld between the tubes.

The threaded connection has dual mating shoulders in which both the internal and the external shoulder mates with its corresponding nose face during initial make-up of the joint. By providing dual mating shoulders, the shoulders share axial compression loads and provide the joint with improved performance in resisting the extreme axial compression loads encountered during pile driving. In addition to providing resistance to axial compression loading, the dual mating shoulders in the present invention also function as torque shoulders to stop axial advancement of the pin and box members during make-up of the joint. The thread form on the pin and box members is straight, rather than tapered, and does not have converging thread flanks, so the threads do not act as a torque stop, nor do they provide and substantial portion of the resistance to the extreme axial compression loading encountered during pile driving.

By providing dual mating shoulders that share the axial compression loads, and by using a thread form having straight threads with uniform axial thread widths, the compressive loads on the pin and box members are transferred substantially through the shoulders rather than through the thread form. This configuration allows the shoulders to take the brunt of the axial compression loading and spare the threads. This configuration avoids high surface contact stress on the threads to prevent galling and other localized thread damage that severely limit the number of times the connection can be made up. This configuration also helps to prevent stress corrosion cracking that occurs in areas of high surface contact stress that are exposed to sulfide in petroleum wells. The use of a straight thread form, rather than tapered, provides substantially the one-half thickness of the wall of the pin and box members for sustaining compressive, tensile, and bending forces to which the pipe exposed.

The straight thread form provides substantially the full one half thickness of the wall of the pin and box members for sustaining the force to which the pipe is exposed, but the ideal design of the pin and box members results in the wall thickness of the pin and box members being not precisely one-half the connector thickness. The optimal design provides that the pin and box members will be of equal strength. In order to design the pin and box members to be of equal strength, the pin and box members are configured to have equal annular cross-sectional areas. Because the inner diameter of the box member is aligned with the outer diameter of the pin member, the medial diameter of the box member is larger than the medial diameter of the pin member. To design the pin and box members to be of equal strength, the wall thickness of the pin member (the member with a smaller medial diameter) is increased to slightly greater than one-half the total wall thickness of the connection, and the wall thickness of the box member (the member with a larger medial diameter) is decreased to slightly less than one-half the total wall thickness of the connection. This optimal design provides substantially the full one-half thickness of the wall of the pin and box members for sustaining the forces to which the pipe is exposed, but also provides that the wall thickness of the pin and box members will be slightly other than precisely one-half the connector thickness, in order to provide that the pin and box members will be of equal strength.

The present invention also provides an integrated guiding means to facilitate entry of the pin in to the box member. This integrated guiding means also functions as a self-centering means to align the pin and box members upon threaded engagement to avoid cross-threaded. The integrated guiding and self-centering means is achieved by providing a design in which the shoulders and nose faces of the and box members are axially spaced from their most adjacent thread flanks. This configuration facilitates entry of the pin and box members at the point of threaded engagement, thus avoiding cross-threading.

Another feature of the present invention is the use of trapped thread flanks to prevent separation of the pin and box members. Conventional pin and box connections are susceptible to separation, often called "jumpout", when the connection is subjected to extensive axial tension and/or bending type loads. Under axial loading in tension, the members will shrink due to the "Poisson's" effect, and the box member will expand or "bell out", a condition known as "belling". To counteract these conditions, the thread form is provided with reverse angle load flanks, often referred to as "trapped" or "hooked" thread flanks. When the connection is subjected to axial loads in tension, the trapped load flanks cause the pin member to be pulled radially inward toward the pin member. This feature secures the pin and box members together and prevents jumpout that could otherwise cause failure of the joint. By placing the box member in a state of hoop compression and the pin member in hoop tension, the trapped load flanks also serve to counteract induced assembly stresses and improve the joints's strength in sulfur environments that could otherwise make the joint susceptible to stress corrosion or hydrogen fracture.

In addition to providing trapped thread flanks to prevent jumpouts, the present invention provides trapped nose faces as well. Some prior art designs provide mating shoulders and nose faces having dissimilar angles so that the shoulder the nose face. One example is found in U.S. Pat. No. 4,822,081, issued to Thomas L. Blose. The Blose patent discloses a shoulder and nose face having dissimilar angles so that the shoulder traps the nose face and the nose face will not slip out upon the application of axial driving force. The present invention improves on this type of feature by providing a trapped nose face that is radially balanced to provide a radially balanced resistance to axial loading compression. The radially balanced nose face efficiently distributes compressive forces and allows the nose face to withstand increased compressive loading without yielding.

Another feature of the present invention is a thread form configuration that provides a quick make-up of the joint. As can be seen in the drawings more fully described below, the preferred embodiment provides complete make-up of the joint in approximately one and one-half turns, a feature which offers great advantages in the field. The connection of the present invention can be made-up in less than ten minutes, in part due to the fact that very little turning is required. Welding, in contrast, typically requires about an hour to complete.

Also disclosed is a method for connecting large diameter tubes without a weld between the tubes, the method comprising:

providing a first large diameter tube comprising a pin member with external threads, and a guiding surface integral with the external threads;

providing a second large diameter tube comprising a box member with internal threads and a guiding surface integral with the internal threads and complementary to the guiding surface of the pin member to facilitate entry of the pin member threads into the box member threads;

aligning the guiding surfaces of the pin member and the box member; and connecting the first and second tubes in as few as approximately one and one-half turns by turning one of the tubes in relation to the other so that the pin member threads enter the box member threads to form a connection between the first tube and the second tube.

The present invention will be more fully understood from the following description of the preferred embodiments, given by way of example only, with reference to the drawings.

DETAILED DESCRIPTION

Figure 1:
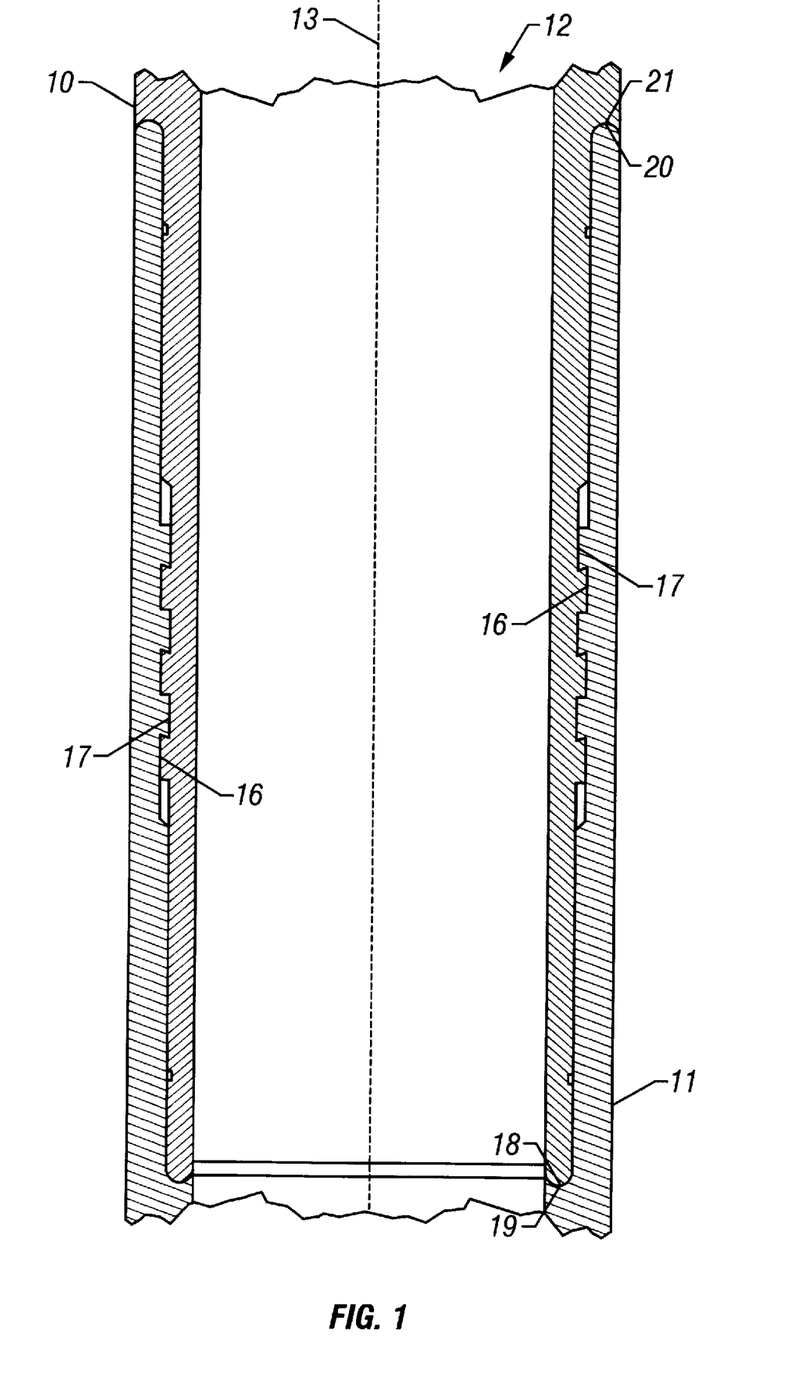
FIG. 1 shows a cross-section view of a tool joint constructed in accordance with this invention.

FIG. 1 shows a cross-sectional view of a threaded connection according to the present invention with the pin and box members in a fully made-up condition. FIG. 1 shows upper pin member 10 secured into lower box member 11 to form a connection designated generally as 12 along axis 13. In a preferred embodiment, the threaded connection 12 has mating pin and box members having outside diameters and inside diameters substantially identical for each of the two members. This is commonly referred to as a flush connection when assembled. The flush connection is preferred in practice to avoid irregularities on the outer surface of the joint that cause resistance when driving the casing into the ground or when running the pipe through the well bore. Although the flush connection is preferred, the present invention is not limited to flush connections. Nor is the invention limited to the pin and box members being integral parts of their respective pipe members. The pin and box members may be integral of their respective pipe members, or may be added thereto by welding or threaded engagement. Still referring to FIG. 1, the threaded connection 12 includes pin member threads 16 that are adapted to be made-up with box member threads 17. Also shown in FIG. 1 are pin member nose face 18, box member shoulder 19, box member nose face 20 and pin member shoulder 21.

Figure 2:
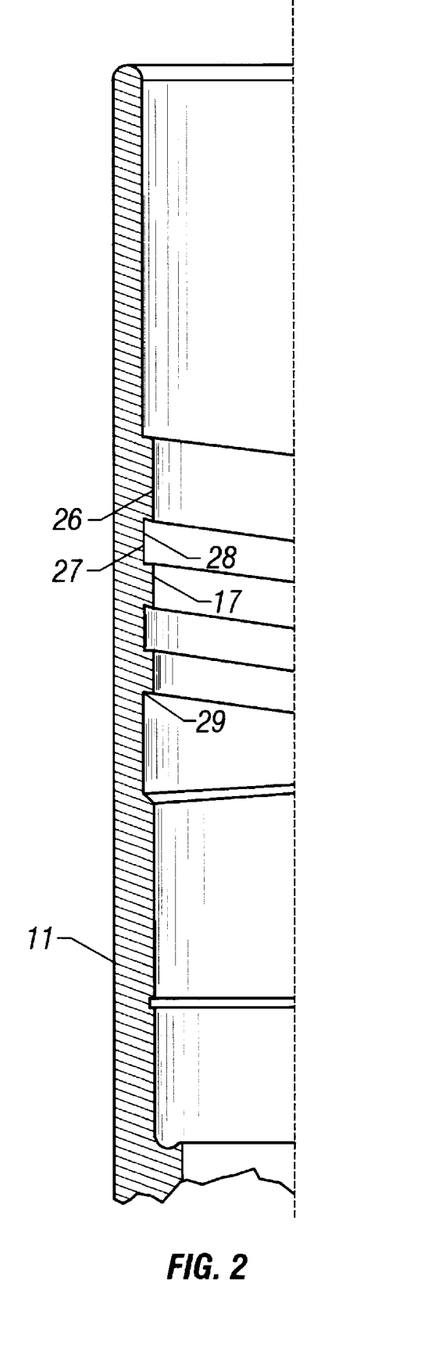
FIG. 2 shows a partial cross-section of a box member.

FIG. 2 shows a partial cross-section of the box member 11. The box member 17 includes box member threads 17 having box thread crests 26 and roots 27. The box member threads 17 also include stab flanks 28 and load flanks 29. The term stab flank refers to the side of the thread facing inwardly towards the joint, and term load flank refers to the side of the thread facing away from the joint.

Figure 3:
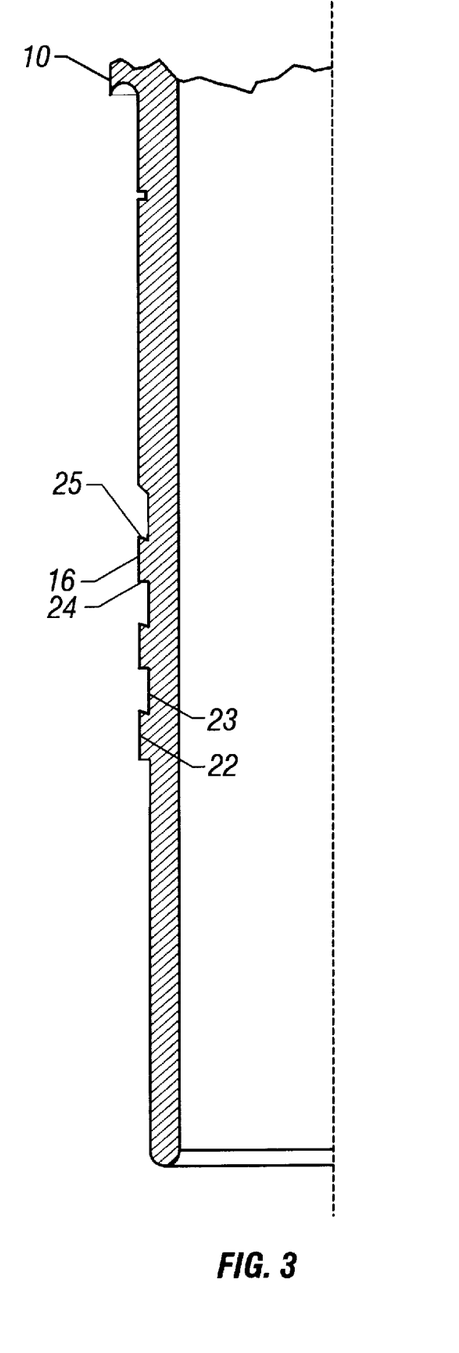
FIG. 3 shows a partial cross section of a pin member.

FIG. 3 shows a partial cross-section of the pin member 10. The pin member 10 includes pin member threads 16, which have pin thread crests 22 and roots 23. Also shown are pin member stab flanks and load flanks 25.

Figure 4:
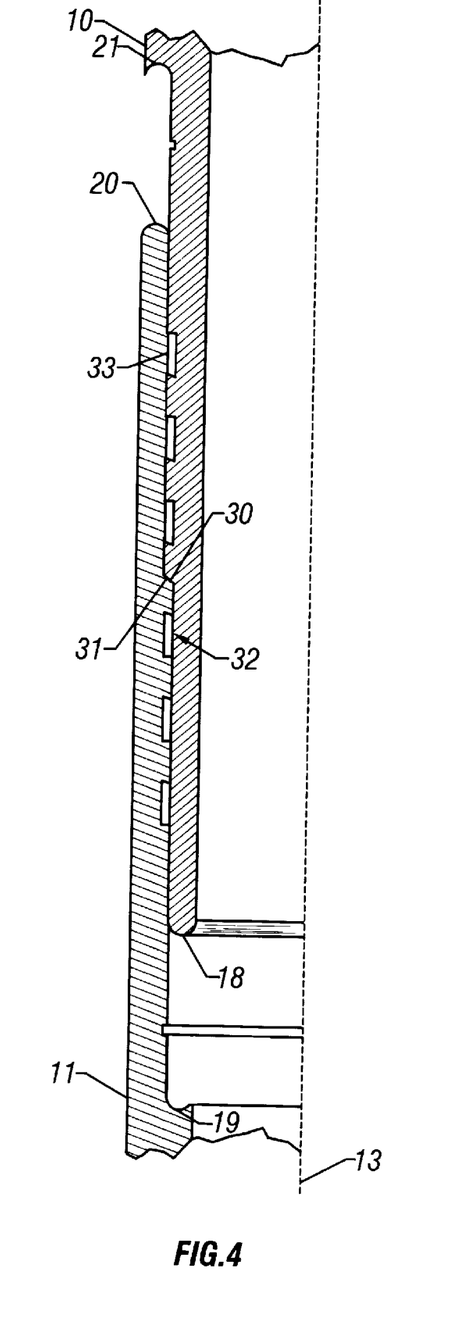
FIG. 4 shows a partial cross-section of the threaded connection prior to make-up of the joint.

FIG. 4 shows a partial cross-section of the threaded connection prior to final make-up. The figure shows the connection at the point of threaded engagement at which the first stab flank 30 on the pin member contacts the first stab flank 31 on the box member. In this position, one can see that the axial spacing between the nose face 18 and the first stab flank 30 on the pin member, and the axial spacing between the nose face 20 and the first stab flank 31 on the box member, form guiding surface 32 on the pin member and 33 on the box member. These guiding surfaces facilitate entry of the pin into the box member and function as self centering means to align the pin and box members upon threaded engagement to avoid cross-threading. This configuration prevents cross-threading by constricting the relative orientation of the pin and box members at the point of threaded engagement.

Figure 5:
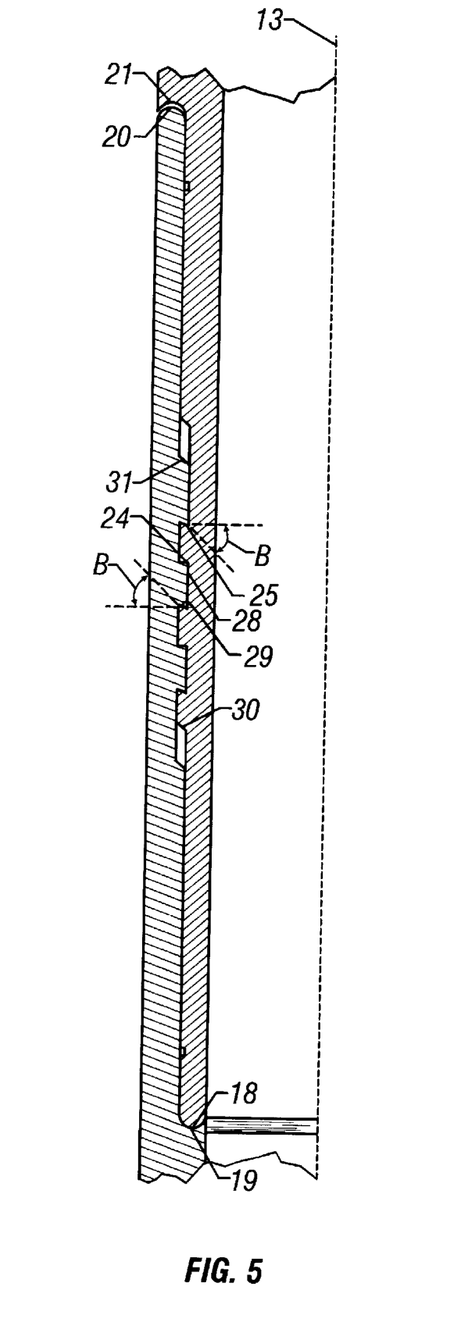
FIG. 5 shows a partial cross-section of the threaded connection in the fully made-up condition.

FIG. 5 shows the threaded connection in a fully made-up condition. The tolerances of the thread form are designed so that when the joint is fully made-up, although the load flanks are in intimate contact, the clearances remain between the stab flanks to ensure that compressive loads on the pin and box members are transferred substantially therethrough the pin and box shoulders rather than through the thread form. FIG. 5 shows stab flanks 24, 28, 30, and 31 as substantially square. Load flanks 25 and 29 form "nonpositive" or "reverse" angle, or may form a trapped angle, to create a trapped or hooked thread. In this configuration, the thread crest extends over the thread root. The nonpositive angled load flanks help ensure that the thread do not slip out and become disengaged during axial loading tension.

Figure 6:
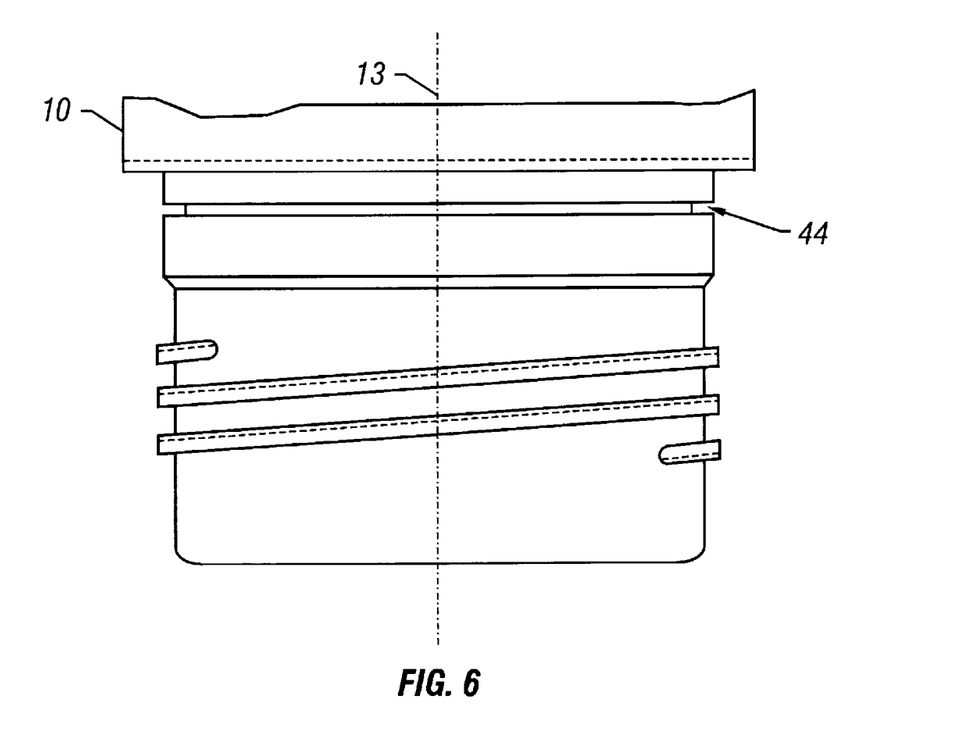
FIG. 6 shows the lower end of a pin member.
Figure 7:
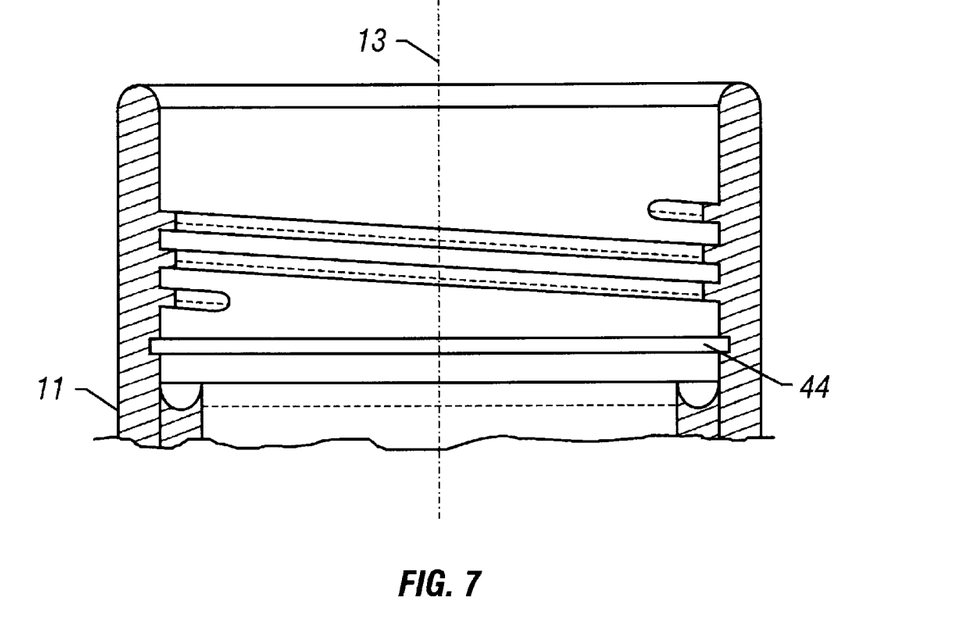
FIG. 7 shows the lower end of a box member

FIG. 6 shows the lower end of pin member 10. FIG. 7 shows a cross-section of the upper end of box member 11. Seal groove 44 is identified in FIGS. 6 and 7. Seal groove 44 on pin member 10 is located proximate the shoulder of pin member 10 and seal groove 44 on box member 11 is located proximate the shoulder of box member 11. Each of these seal grooves 44 may be used to contain an elastomer ring or metal seal to seal pin 10 and box 11 members from leakage. The connection may be designed to include one or both of these seal grooves or may be configured to not include either seal groove. Regardless of whether a seal groove is included in the design, the annular shoulder region 47 of pin member 10 function as a seal against the annular end region 48 of box member 11 and the annular shoulder region 49 of box member 11 seals against the end region 50 of pin member 10. As described above, the annular shoulder region function as a guiding surface as well as a sealing surface.

The above disclosure and description is illustrative and explanatory of the present invention, and it understood that various changes in the method steps as well as the details of the illustrated apparatus may be made within the scope of the following claims without departing from the spirit of the invention.

What is claimed is:

1. A threaded connector for connecting large diameter tubes, the connector comprising:

a first large diameter tube comprising a pin member having a pin nose with at least one external pin thread having a first wrap adjacent the pin nose of said pin member, the first large diameter tube having a first internal diameter adjacent said pin member, the at least one pin thread having a pin crest surface with a pin crest surface outer diameter along the first wrap, and a pin guiding surface forming the pin nose of the pin member; and a second large diameter tube comprising a box member having a box nose with at least one internal box thread having a first wrap adjacent the box nose of the box member, the second large diameter tube having a second internal diameter adjacent the box member, the at least one box thread having a box crest surface with a box crest diameter along the first wrap, a box guiding surface forming the box nose of the box member, the box guiding surface having an internal diameter mating to the pin crest surface outer diameter along the first wrap, the pin guiding surface having an external diameter mating to the box crest diameter along the first wrap;

the pin nose ending with a metallic pin face surface;

a pin nose receiving shoulder for the box member, the pin nose receiving shoulder having a first metallic recessed socket portion to mate with the pin face surface, the pin nose receiving shoulder having an internal ridge that forms the radially innermost portion of the pin nose receiving shoulder, the first metallic recessed socket portion having a deeper axial depth as compared to the internal ridge;

the box nose face ending with a metallic box face surface;

a box nose receiving shoulder for the pin member, the box nose receiving shoulder having a second metallic recessed socket portion to mate with the box face surface, the box nose receiving shoulder having an external ridge that forms the radially outermost portion of the box nose receiving shoulder, the second metallic recessed socket portion having a deeper axial depth as compared to the external ridge;

the pin nose face and box nose face being axially spaced so as to simultaneously engage in metal-to-metal contact as the threaded connector is made up; and a pin member internal surface having a pin internal diameter substantially equal to the first internal diameter of the first large diameter tubular and the second internal diameter of the second large diameter tubular to provide a substantially constant internal diameter from the first large diameter tubular through the threaded connection and to the second large diameter tubular.

2. The connector of claim 1, wherein the at least one pin member thread and the at least one box member thread comprise trapped flanks to prevent jump out.

3. The connector of claim 1, wherein the first large diameter tube has a diameter of at least twenty-four inches, the second large diameter tube has a diameter of at least twenty-four inches.

4. The connector of claim 1, wherein the pin member thread and the box member thread comprise a straight form along the respective axial length of the pin member thread and the box member thread.

5. The connector of claim 1, wherein
- the metallic pin face surface of the pin nose is rounded and the first metallic recessed socket portion of the pin nose receiving shoulder surface on the box member is correspondingly rounded to mate with the metallic pin face surface, and
- the metallic box face surface of the box nose is rounded and the second metallic recessed socket portion of the box nose receiving shoulder on the pin member is correspondingly rounded to mate with the metallic box face surface.

6. The connector of claim 1, wherein the first large diameter tubular has an outer diameter, the second large diameter tubular has an outer diameter, the threaded connection has an outer diameter equal to the outer diameter of the first large diameter tubular and the outer diameter of the second large diameter tubular so as to provide for a flush joint connection.

7. The connector of claim 1, wherein the combination of the pin nose and pin nose receiving shoulder and the box nose face and box nose receiving shoulder are spaced at a selected position to thereby act as a torque stop to prevent further axial advancement of the pin and box members during make-up of the connection.

8. The connector of claim 1, wherein the pin and box members are integral to their respective tubes.

9. The connector of claim 1, wherein the pin and box members are attached to their respective tubes by welding.

10. The connector of claim 1, wherein the pin and box members are attached to their respective tubes by threaded engagement.

11. A method for connecting large diameter tubes without a weld between the tubes, the method comprising:
- providing a first large diameter tube comprising a pin member with external threads, and a pin guiding surface integral with the external threads;
- providing a second large diameter tube comprising a box member with internal threads and a box guiding surface integral with the internal threads and complementary to the pin guiding surface of the pin member to facilitate entry of the pin member threads into the box member threads;
- providing the pin member with a pin nose having a protruding metallic external end;
- providing the box member with a box nose having a protruding metallic external end;
- providing the pin member with a pin shoulder having a metallic surface forming a pin recessed socket for mating in metal-to-metal contact with the protruding metallic external end of the box nose, the pin shoulder having an external ridge that forms a radially outermost portion of the pin shoulder, the pin recessed socket having a deeper axial depth as compared to the external ridge;
- providing the box member with a box shoulder having a metallic surface forming a box recessed socket for mating in metal-to-metal contact with the pin nose, the box shoulder having an internal ridge that forms a radially innermost portion of the box shoulder, the box recessed socket having a deeper axial depth as compared to the internal ridge; and
- providing that the connection has an internal diameter substantially equal to the internal diameter of the first large diameter tubular and the internal diameter of the second large diameter tubular to provide a substantially constant internal diameter from the first large diameter tubular through the threaded connection and to the second large diameter tubular.

12. The method of claim 11, further comprising:
- providing that the outer diameter of the box member and the first tube and the second tube are substantially equal to thereby connect to form a flush joint connection.

13. The method of claim 11, further comprising:
- providing that the external threads of the pin member comprise a straight form along the length of the external threads,
- providing that the internal threads of box member comprise straight form along the axial length of the internal threads,
- providing that the box guiding surface is cylindrical along its length and mates with the straight form of the external threads of the pin member, and
- providing that the pin guiding surface is cylindrical along its length and mates with the straight form of the internal threads of the box member.

14. The method of claim 11, further comprising:
- providing that the protruding metallic external end of the pin nose is rounded;
- providing that the protruding metallic external end of the box nose is rounded;
- providing that the recessed socket of the pin member shoulder has a rounded surface for mating with the box nose; and
- providing that the recessed socket of the box member has a rounded surface for mating with the pin nose.

15. A threaded connector for connecting large diameter tubes to form a flush joint connection, the connector comprising:
- a first large diameter tube comprising a pin member with at least one external pin thread with a first wrap adjacent a connecting end of said pin member, the first large diameter tube having a first internal diameter adjacent said pin member, the at least one pin thread having a pin crest surface with a pin crest surface outer diameter along the first wrap; and
- a second large diameter tube comprising a box member with at least one internal box thread with a first wrap adjacent a connecting end of the box member, the second large diameter tube having a second internal diameter adjacent the box member, the at least one box thread having a box crest surface with a box crest diameter along the first wrap;
- a pin nose for the pin member at the connection end of the pin member, the pin nose ending with a metallic pin face surface;
- a pin nose receiving shoulder for the box member, the pin nose receiving shoulder having a first metallic recessed socket portion along the pin nose receiving shoulder to mate with the pin face surface, the pin nose receiving shoulder having an internal ridge that forms the radially innermost portion of the pin nose receiving shoulder, the pin nose receiving shoulder having a second internal ridge on an opposite side of said first metallic recessed socket portion, the first metallic recessed socket portion having a deeper axial depth as compared to the internal ridge and the second internal ridge;
- a box nose face for the box member at the connection end of the box member, the box nose face ending with a metallic box face surface;
- a box nose receiving shoulder for the pin member, the box nose receiving shoulder having a second metallic recessed socket portion along the box nose receiving shoulder to mate with the box face surface, the box nose receiving shoulder having an external ridge that forms the radially outermost portion of the box nose receiving shoulder, the box nose receiving shoulder for the pin member having a second external ridge on an opposite side of said second metallic recessed socket portion, the second metallic recessed socket portion having a deeper axial depth as compared to the external ridge and the second external ridge;

the pin nose face and box nose face being axially spaced so as to simultaneously engage in metal-to-metal contact as the threaded connector is made up; and a pin member internal surface having a pin internal diameter substantially equal to the first internal diameter of the first large diameter tubular and the second internal diameter of the second large diameter tubular.

16. The connector of claim 15, wherein the metallic pin face surface of the pin nose is rounded and the first metallic recessed socket portion of the pin nose receiving shoulder surface on the box member is correspondingly rounded to mate with the metallic pin face surface, and the metallic box face surface of the box nose is rounded and the second metallic recessed socket portion of the box nose receiving shoulder on the pin member is correspondingly rounded to mate with the metallic box face surface.

17. The connector of claim 15, further comprising:

a cylindrical guide surface for the pin member having a diameter for mating with the first wrap of the at least one internal box thread; and a cylindrical guide surface for the box member having a diameter for mating with the first wrap of the at least one external pin thread.

18. The connector of claim 15, further comprising:

said at least one pin thread having a constant axial width along its length.

19. The connector of claim 15, wherein the first large diameter tubular has an outer diameter, the second large diameter tubular has an outer diameter, the threaded connection has an outer diameter equal to the outer diameter of the first large diameter tubular and the outer diameter of the second large diameter tubular so as to provide for a flush joint connection.

* * * * *